(12) United States Patent
Samie et al.

(10) Patent No.: US 7,621,385 B2
(45) Date of Patent: Nov. 24, 2009

(54) ELECTRONICALLY CONTROLLED CONVERTER CLUTCH FOR AN AUTOMATIC TRANSMISSION

(75) Inventors: Farzad Samie, Franklin, MI (US); Richard W. Carlson, Joliet, IL (US); Andrew L. Bartos, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 386 days.

(21) Appl. No.: 11/475,335

(22) Filed: Jun. 27, 2006

(65) Prior Publication Data

US 2007/0295572 A1 Dec. 27, 2007

(51) Int. Cl.
*F16H 45/02* (2006.01)
(52) U.S. Cl. ..................................... 192/3.29
(58) Field of Classification Search .............. None
See application file for complete search history.

(56) References Cited

U.S. PATENT DOCUMENTS

| 4,051,932 | A | 10/1977 | Arai et al. | |
|---|---|---|---|---|
| 4,199,047 | A | 4/1980 | Ling | |
| 5,058,716 | A * | 10/1991 | Lippe et al. | 192/3.33 |
| 2003/0178275 | A1* | 9/2003 | Breier et al. | 192/3.29 |
| 2004/0060793 | A1* | 4/2004 | Dacho et al. | 192/3.29 |
| 2005/0115788 | A1* | 6/2005 | Ackermann et al. | 192/3.29 |

FOREIGN PATENT DOCUMENTS

| DE | 4330264 A1 | 3/1994 |
|---|---|---|
| DE | 19915527 A1 | 10/2000 |
| JP | 02062473 A * | 3/1990 |

* cited by examiner

*Primary Examiner*—Richard M. Lorence

(57) ABSTRACT

The apparatus of the present invention provides a torque converter for an automatic transmission. The torque converter includes an electronically controlled converter clutch disposed within a torque converter housing. A release passage in fluid communication with the electronically controlled converter clutch is defined between standard functional torque converter components. The release passage is configured to transfer hydraulic fluid to release the electronically controlled converter clutch. An apply passage in fluid communication with the electronically controlled converter clutch is also defined between standard functional torque converter components. The apply passage is configured to transfer hydraulic fluid to engage the electronically controlled converter clutch. The electronically controlled converter clutch is characterized by the absence of a dedicated hydraulic supply line.

12 Claims, 3 Drawing Sheets

ELECTRONICALLY CONTROLLED CONVERTER CLUTCH FOR AN AUTOMATIC TRANSMISSION

TECHNICAL FIELD

The present invention pertains generally to an electronically controlled converter clutch and a method of operation.

BACKGROUND OF THE INVENTION

A torque converter is a hydrodynamic unit that transfers torque between an engine and an automatic transmission. The torque converter generally includes a torque converter pump (driving member), a turbine (a driven member), and a stator that are disposed in a housing full of hydraulic fluid. The torque converter pump is generally disposed at a rear portion of the housing (away from the engine), and it turns with a crankshaft of an engine. The turbine is generally disposed at a front portion of the housing (near the engine), and is connected to a transmission input shaft. The turbine is free to rotate independently from the torque converter pump.

The hydraulic fluid flows from the torque converter pump toward the turbine in a radial outer portion of the torque converter. The hydraulic fluid then flows from the turbine back toward the torque converter pump by way of the stator in a radial inner portion of the torque converter. At low torque converter speed ratios, redirection of the hydraulic fluid by the stator causes torque multiplication thereby improving vehicle performance. However, at higher torque converter speed ratios, the transfer of torque through the torque converter becomes inefficient and impairs fuel economy.

In order to optimize vehicle efficiency, the torque converter may be "locked" after a predefined torque converter speed ratio is reached such that the torque converter pump and turbine are mechanically coupled and rotate together. A "lock-up" clutch is therefore commonly provided to lock the torque converter and thereby optimize efficiency. The lock-up clutch may be an electronically controlled converter clutch (hereinafter ECCC) configured to lock-up completely or to selectively slip in a controllable manner. Therefore, the ECCC can absorb a portion of an engine torque spike by controlled slipping to provide smoother vehicle operation. In other words, the ECCC may be programmed to slip by an amount necessary to prevent the engine torque spike from being transferred to the transmission.

SUMMARY OF THE INVENTION

The apparatus of the present invention provides a torque converter for an automatic transmission. The torque converter includes an electronically controlled converter clutch disposed within a torque converter housing. A release passage in fluid communication with the electronically controlled converter clutch is defined between standard functional torque converter components. The release passage is configured to transfer hydraulic fluid to release the electronically controlled converter clutch. An apply passage in fluid communication with the electronically controlled converter clutch is also defined between standard functional torque converter components. The apply passage is configured to transfer hydraulic fluid to engage the electronically controlled converter clutch. The electronically controlled converter clutch is characterized by the absence of a dedicated hydraulic supply line.

The apparatus may also include an isolator configured to at least partially absorb engine torque spikes and thereby provide smoother operation.

The apparatus may also include a torque converter pump operatively connected to a pump hub; a turbine operatively connected to a turbine shaft; and a stator operatively connected to a stator shaft.

The release passage may be defined between the pump hub and the stator shaft.

The apply passage may be defined between the stator shaft and the turbine shaft.

The isolator may be disposed downstream from the turbine such that any turbine inertia spikes are at least partially absorbed thereby providing smoother operation.

The electronically controlled converter clutch may include a first and second plurality of clutch plates.

The electronically controlled converter clutch may include a piston selectively configured to bring the first and second plurality of clutch plates into engagement and thereby engage the electronically controlled converter clutch.

The piston may include a one-way valve configured to permit the transfer of hydraulic fluid in a first direction through the piston, and to restrict the transfer of hydraulic fluid in an opposite direction through the piston.

The piston may include an orifice configured to permit the transfer of a predetermined amount of hydraulic fluid through the piston in order to facilitate the circulation of hydraulic fluid and thereby cool the torque converter.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
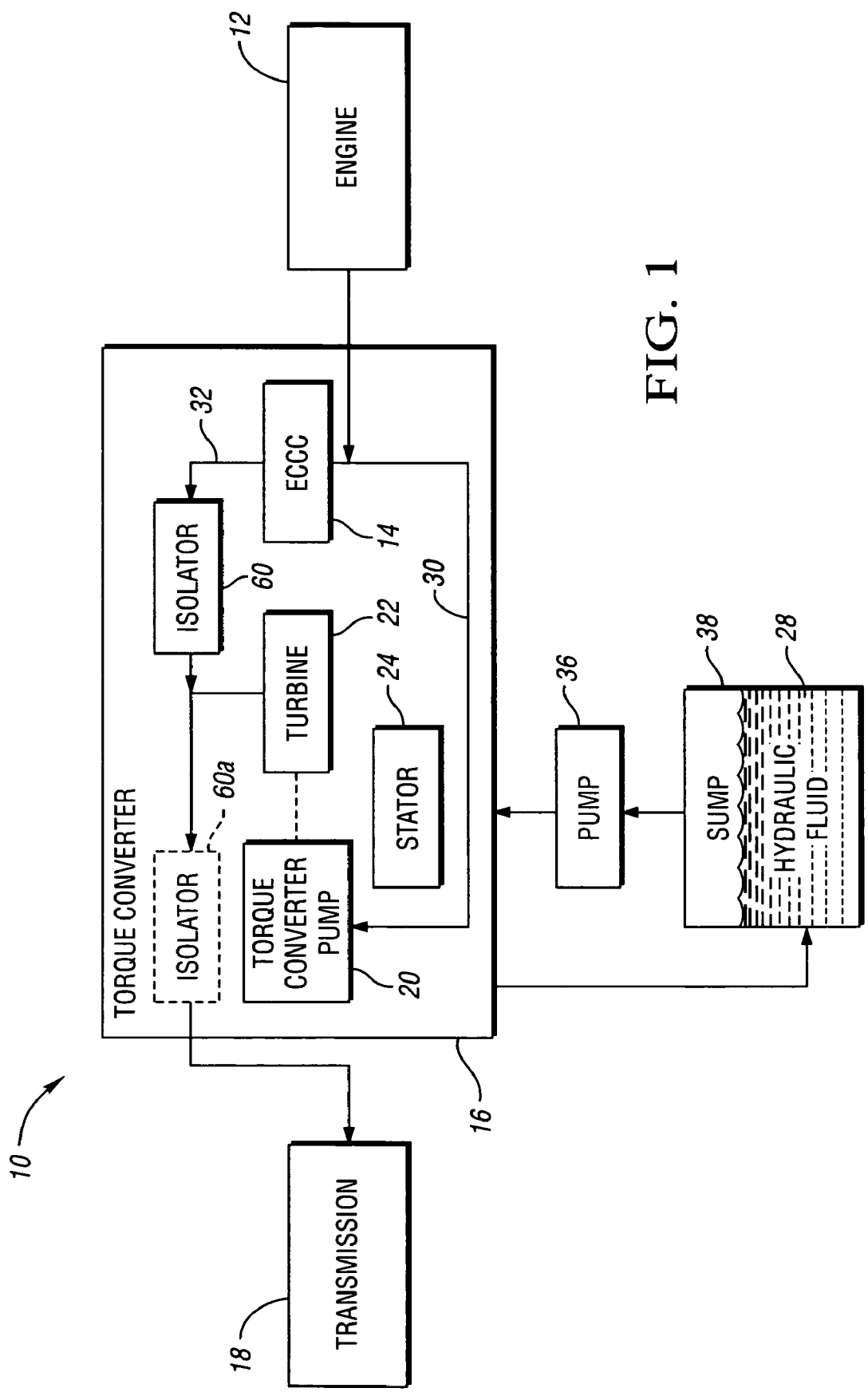
FIG. 1 is a schematic depiction of a vehicle having a torque converter in accordance with the preferred embodiment of the present invention.

Referring to the drawings, wherein like reference numbers refer to like components, FIG. 1 shows a schematic depiction of a vehicle 10 in accordance with the present invention. The vehicle 10 includes an engine 12, a torque converter 16, and a transmission 18. The torque converter 16 includes an electronically controlled converter clutch (hereinafter ECCC) 14, a torque converter pump 20 (a driving member), a turbine 22 (a driven member), and a stator 24. The torque converter 16 further includes a housing member 26 (shown in FIG. 2) attached to the torque converter pump 20 such that a chamber full of hydraulic fluid 28 is formed therebetween.

According to the preferred embodiment of the present invention, the torque converter 16 includes an isolator 60 positioned as shown. According to an alternate embodiment described in detail hereinafter with respect to FIG. 2a, the isolator 60a may be relocated as shown by the dashed line representation thereof. It should therefore be appreciated that one or the other, but not both, of the isolators 60, 60a are implemented for a given embodiment.

The ECCC 14 has three primary operational modes including "disengaged", "completely engaged", and "partially engaged". "Disengaged" refers to the mode wherein the clutch plates 56, 58 (shown in FIG. 2) do not come into contact with each other are therefore free to rotate independently. "Fully engaged" refers to the mode wherein the clutch plates 56, 58 are brought into engagement with an apply force that is sufficient to prevent relative rotation or "slip" under normal operating conditions. "Partially engaged" refers to the mode wherein the clutch plates 56, 58 are brought into engagement with a reduced apply force such that clutch plates 56, 58 can slip in a controllable manner.

When the ECCC 14 is disengaged, the engine 12 can transfer torque to the transmission 18 via a first power-flow path 30. Torque transferred via the first power-flow path 30 is passed from the engine 12, through the torque converter housing 26 (shown in FIG. 2), and to the torque converter pump 20. Thereafter, engine torque is transferred from the torque converter pump 20 to the turbine 22 through an operation of the hydraulic fluid 28. The turbine 22 is connected to a turbine shaft 34 (shown in FIG. 2) which drives the transmission 18. According to the preferred embodiment of the present invention shown in FIGS. 1 and 2, when the ECCC 14 is disengaged, the path of engine torque bypasses the isolator 60 via power-flow path 30.

The transfer of engine torque from the torque converter pump 20 to the turbine 22 through an operation of the hydraulic fluid 28 generally occurs in the following manner. Rotation of the torque converter pump 20 causes the hydraulic fluid 28 to be directed outward toward the turbine vanes (not shown). When this occurs with sufficient force to overcome the resistance to rotation, the turbine 22 begins to turn. The fluid flow exiting the turbine 22 is directed back into the torque converter pump 20 by way of the stator 24. The stator 24 redirects the fluid flow from the turbine 22 to the torque converter pump 20 in the same direction as torque converter pump rotation, thereby reducing pump torque and causing torque multiplication.

When the ECCC 14 is completely engaged, the engine 12 can transfer torque to the transmission 18 via a second power-flow path 32. As will be described in detail hereinafter, engagement of the ECCC 14 mechanically couples the torque converter pump 20 and the turbine 22 such that the torque converter pump 20 and turbine 22 rotate together. Therefore, engine torque is transferable to the transmission 18 without any efficiency losses associated with the operation of the hydraulic fluid 28. The second power-flow path 32 also preferably incorporates an isolator 60 configured to at least partially absorb engine torque spikes and thereby provide smoother vehicle operation. According to the preferred embodiment of the invention shown in FIGS. 1 and 2, when the ECCC 14 is completely engaged, the path of engine torque is through the isolator 60 and the inertia of the turbine 22 is downstream relative to the isolator 60.

When the ECCC 14 is partially engaged, it can selectively slip in a controllable manner and thereby transfer torque via both the first and second power-flow paths 30, 32. By controlling the degree of ECCC 14 engagement, and correspondingly the amount of slip, the ECCC 14 may be implemented to at least partially absorb engine torque spikes and thereby provide smoother vehicle operation.

The ECCC 14 is preferably hydraulically actuated, and the operational mode of the ECCC 14 is selectable by transferring hydraulic fluid 28 through the torque converter 16 in a predefined manner as will be described in detail hereinafter. Accordingly, a pump 36 is provided to transfer the hydraulic fluid 28 from a sump 38 to the torque converter 16. After being circulated through the torque converter 16, the hydraulic fluid 28 is returned to the sump 38.

Figure 2:
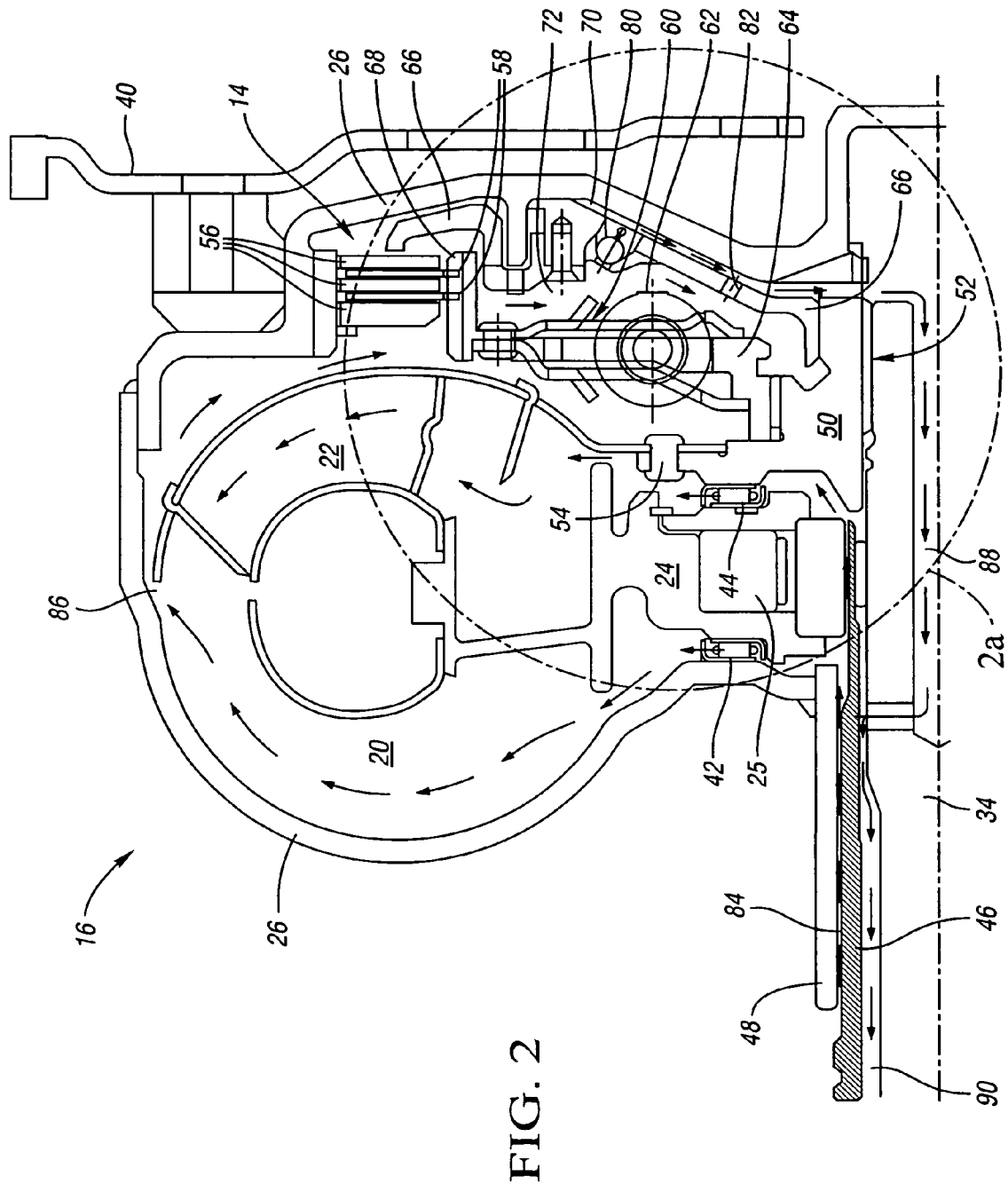
FIG. 2 is a partial sectional view of the torque converter of FIG. 1.

Referring to FIG. 2, the torque converter 16 is shown in more detail. A flexplate 40 is operatively connected to both the engine 12 (shown in FIG. 1) and the torque converter housing 26 such that engine output is transferable therebetween. The torque converter 16 preferably includes a first and second thrust bearing 42, 44 configured to rotatably support the stator 24. The stator 24 is connected to a stator shaft 46 by way of a one-way roller clutch 25 which prevents rotation of the stator 24 at lower torque converter 16 speeds. At higher torque converter 16 speeds, the direction of hydraulic fluid 28 leaving the turbine 22 changes causing the stator 24 to overrun the one-way clutch 25 and rotate freely on the stator shaft 46. The torque converter pump 20 is secured to the pump hub 48, and the turbine 22 is secured to the turbine shaft 34. According to the preferred embodiment, a coupling device 50 is disposed between the turbine 22 and the turbine shaft 34. The coupling device 50 engages the turbine shaft 34 via a splined interface 52, and the coupling device 50 is also secured to the turbine 22 such as, for example, with a plurality of rivets 54.

As shown in FIG. 2, the torque converter 16 includes the ECCC 14 which is disposed within the torque converter housing 26. The ECCC 14 includes a first and second plurality of clutch plates 56, 58 that are selectively engageable with each other. The first plurality of clutch plates 56 are secured to the torque converter housing 26, and the second plurality of clutch plates 58 are mounted to the radially outer portion 68 of the isolator 60. The isolator 60 includes a plurality of isolator springs 62 configured to at least partially absorb an engine torque spike in order to provide smoother vehicle operation. A radially inner portion 64 of the isolator 60 is splined to the coupling device 50 which is in turn splined to the turbine shaft 34.

The ECCC 14 also includes a piston 66 configured to selectively bring the second plurality of clutch plates 58 into engagement with the first plurality of clutch plates 56 and thereby engage the ECCC 14. A first cavity 70 is defined between the piston 66 and the torque converter housing 26, and a second cavity 72 is defined between the piston 66 and the isolator 60. When the fluid pressure in the second cavity 72 exceeds that in the first cavity 70, the piston 66 is translated in a direction toward the engine 12 (shown in FIG. 1) thereby disengaging the first and second plurality of clutch plates 56, 58. When the fluid pressure in the first cavity 70 exceeds that in the second cavity 72, the piston 66 is translated in a direction toward the transmission 18 (shown in FIG. 1) thereby engaging the first and second plurality of clutch plates 56, 58. The amount by which the pressure in the first cavity 70 exceeds the pressure in the second cavity 72 dictates the degree of ECCC 14 engagement. In other words, if the pressure in the first cavity 70 only slightly exceeds the pressure in the second cavity 72, the ECCC 14 is only partially engaged and may therefore slip. It should therefore be appreciated that by controlling the pressure levels in the cavities 70 and 72, the ECCC 14 can correspondingly be controlled to disengage, completely engage, or partially engage and slip in a controllable manner.

The piston 66 of the ECCC 14 includes a one-way valve 80 configured to permit the transfer of hydraulic fluid 28 (shown in FIG. 1) from cavity 72 to cavity 70, and to block the transfer of hydraulic fluid 28 from cavity 70 to cavity 72. While a single one-way valve 80 is shown, it should be appreciated that multiple valves may alternatively be implemented. The piston 66 also preferably defines one or more orifices 82. According to the preferred embodiment, the orifice 82 is configured to allow the transfer of approximately 0.5 gallons per minute (gpm) of hydraulic fluid 28 between the cavities 70 and 72. The orifice 82 allows for the circulation of a predetermined amount of hydraulic fluid 28 throughout the torque converter 16 in order to prevent heat buildup.

To release the ECCC 14, the pump 36 (shown in FIG. 1) is operated to transfer hydraulic fluid 28 (shown in FIG. 1) through the torque converter 16 in the direction of the arrows as will now be described in detail. The hydraulic fluid 28 is transferred initially through a release passage 84 defined between the pump hub 48 and the stator shaft 46. Thereafter, the hydraulic fluid 28 passes via a first flow path through the thrust bearing 42 and across the blades (not shown) of the torque converter pump 20, and via a second flow path through the thrust bearing 44 and across the blades (not shown) of the turbine 22. The hydraulic fluid 28 exits a gap 86 defined between the turbine 22 and the torque converter housing 26, passes by the clutch plates 56, 58 and into the second cavity 72. The hydraulic fluid 28 in the second cavity 72 is transferred to the first cavity 70 primarily through the one-way valve 80 and also through the orifice 82. The hydraulic fluid 28 in the first cavity 70 is transferred through a cavity 88 defined by the turbine shaft 34, out of an apply passage 90 defined between the stator shaft 46 and the turbine shaft 34, and is then sent back to the sump 38 (shown in FIG. 1) to be recycled. It should be appreciated that the transfer of hydraulic fluid 28 into the second cavity 72 generates pressure therein such that the piston 66 is translated away from the clutch plates 56, 58 and the ECCC 14 remains disengaged.

To either partially or completely engage the ECCC 14, the pump 36 (shown in FIG. 1) is operated to transfer hydraulic fluid 28 (shown in FIG. 1) through the torque converter 16 in a direction opposite to that shown by the arrows and previously described with respect to the release of the ECCC 14. Therefore, to engage the ECCC 14, the pump 36 initially transfers hydraulic fluid 28 through the apply passage 90 and into the first cavity 70. This transfer of hydraulic fluid 28 into the first cavity 70 generates pressure therein such that the piston 66 is translated toward the clutch plates 56, 58. The translation of the piston 66 applies a force tending to bring the first and second plurality of clutch plates 56, 58 into contact with each other such that the ECCC 14 is engaged. The magnitude of the force applied by the piston 66 is proportional to the pressure level in the first cavity 70. Therefore, the degree of ECCC 14 engagement is selectable by controlling the output of the pump 36 as it transfers hydraulic fluid 28 into the first cavity 70.

The one-way valve 80 closes to block the transfer of hydraulic fluid 28 (shown in FIG. 1) from the first cavity 70 to the second cavity 72. Therefore, the only transfer of hydraulic fluid 28 from the first cavity 70 to the second cavity 72 takes place through the orifice 82, and the rate of such transfer is dictated by the size of the orifice 82. According to the preferred embodiment, the orifice 82 is large enough to allow the transfer of approximately 0.5 gpm of hydraulic fluid 28 from the first cavity 70 to the second cavity 72 when the ECCC 14 is engaged. The hydraulic fluid 28 in the second cavity 72 is transferred through the gap 86 and thereafter passes via a first flow path across the blades (not shown) of the torque converter pump 20 and through the thrust bearing 42, and via a second flow path across the blades (not shown) of the turbine 22 and through the thrust bearing 44. These two flow paths come together at the release passage 84 which routes the hydraulic fluid back to the sump 38 (shown in FIG. 1).

By establishing the apply passage 90 which is in fluid communication with the cavity 88, hydraulic fluid 28 is transferable to precisely control the actuation of the piston 66. As the apply passage 90 formed between standard functional torque converter components (the pump hub 48 and the stator shaft 46), an additional dedicated hydraulic line is not required to control the piston 66 thereby providing a simplified and more compact design with fewer components.

Figure 2A:
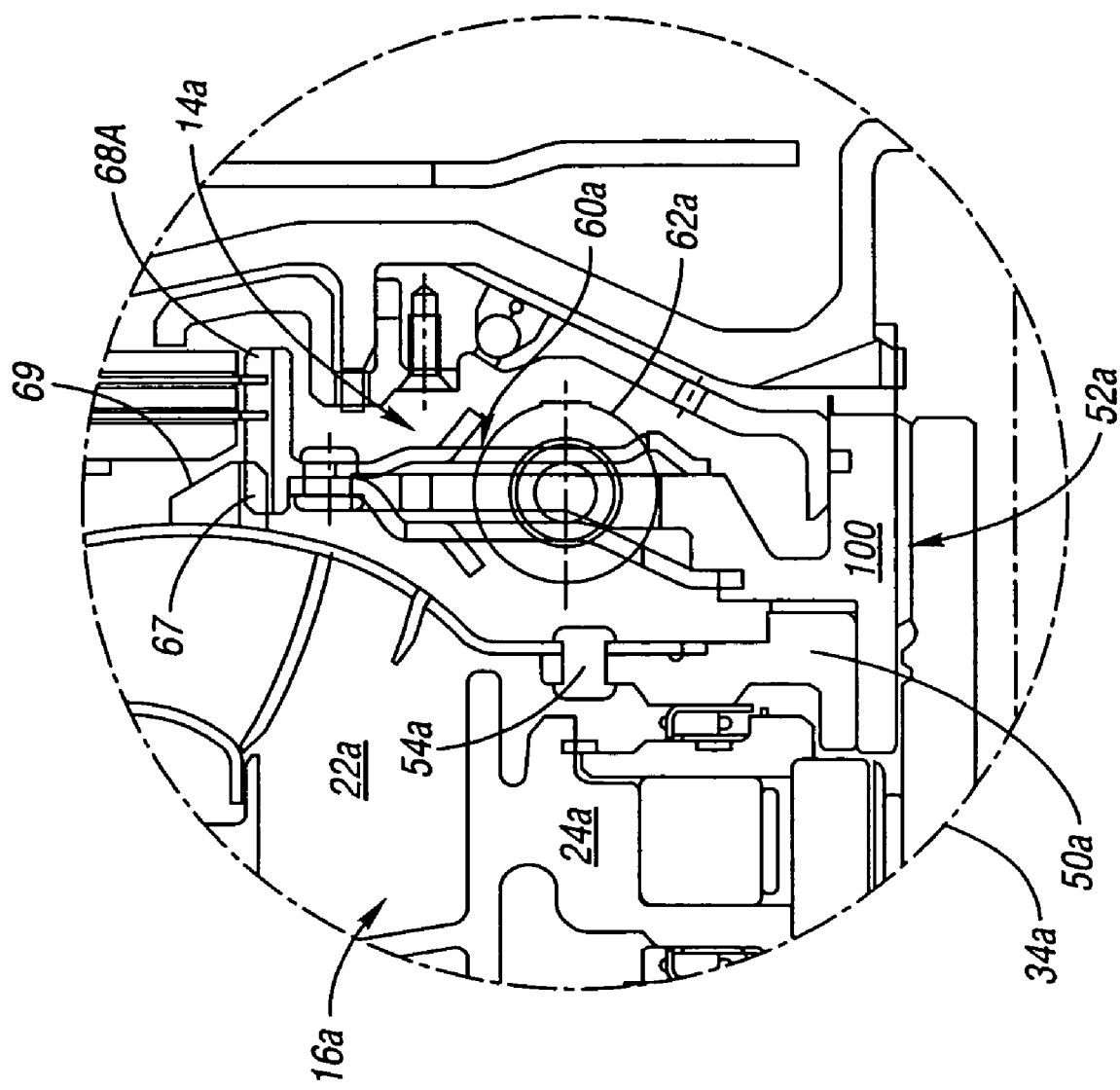
FIG. 2a is a sectional view of a portion of the torque converter of FIG. 2 in accordance with an alternate embodiment of the present invention.

Referring to FIG. 2a, the circled region of FIG. 2 labeled as 2a is shown in accordance with an alternate embodiment to highlight the differences between the previously described preferred embodiment of the present invention and the alternate embodiment described in detail hereinafter. Unless expressly provided otherwise, the remainder of the torque converter 16a which is not shown should be assumed to be similar to that of the torque converter 16 (shown in FIG. 2). Like reference numbers are used in FIG. 2a to refer to like components from FIG. 2. For example, the suffix "a" added to a reference numeral in FIG. 2a identifies an alternate embodiment of a similar component from FIG. 2.

According to the alternate embodiment, the isolator 60a includes a generally cylindrical radially inner portion 100 which directly engages the turbine shaft 34a such as, for example, with the splined section 52a. The turbine 22a is riveted to the coupling device 50a such as with one or more rivets 54a. The coupling device 50a is rotatably connected to the generally cylindrical radially inner portion 100 of the isolator 60a. A ring 69 is affixed to the turbine 22a such that it continually engages the radially outer portion 68a of isolator 60a via a splined interface 67.

When the ECCC 14a is in any one of its three primary operating modes (i.e., disengaged, completely engaged, or partially engaged), turbine 22a inertia is upstream of the isolator 60a (as shown by the dashed line representation thereof in FIG. 1). It should therefore be appreciated that, according to the alternate embodiment of FIG. 2a, at least a portion of any turbine output passes through the isolator 60a as such output is transferred to the turbine shaft 34. Therefore, the isolator 60a may be implemented to dampen any turbine inertia spikes and thereby provide smoother operation.

While the best modes for carrying out the invention have been described in detail, those familiar with the art to which this invention relates will recognize various alternative designs and embodiments for practicing the invention within the scope of the appended claims.

The invention claimed is:

1. A torque converter for an automatic transmission comprising:
   a torque converter housing;
   an electronically controlled converter clutch disposed within the torque converter housing;
   a release passage in fluid communication with the electronically controlled converter clutch, the release passage defined between standard functional torque converter components, the release passage configured to transfer hydraulic fluid to release the electronically controlled converter clutch;
   an apply passage in fluid communication with the electronically controlled converter clutch, the apply passage defined between standard functional torque converter components, the apply passage configured to transfer hydraulic fluid to engage the electronically controlled converter clutch; and
   a piston defining a first cavity and a second cavity and configured to selectively engage the electronically controlled converter clutch;
   wherein the first cavity is in fluid communication with the apply passage such that hydraulic fluid is applied from the apply passage to the piston to engage the electronically controlled converter clutch;
   wherein the second cavity is in fluid communication with the release passage such that hydraulic fluid is applied from the release passage to the piston to release the electronically controlled converter clutch;

wherein the electronically controlled converter clutch is characterized by the absence of a dedicated hydraulic supply line to control the piston;

wherein the piston includes one or more orifices configured to permit the transfer of a predetermined amount of hydraulic fluid through the piston in order to facilitate the circulation of hydraulic fluid and thereby cool the torque converter;

wherein the piston includes one or more one-way valves configured to permit the transfer of hydraulic fluid in a first direction from the second cavity to the first cavity through the piston, and to restrict the transfer of hydraulic fluid in an opposite direction from the first cavity to the second cavity through the piston;

wherein the transfer of hydraulic fluid from the second cavity to the first cavity in the first direction is only through the one or more orifices and the one or more one-way valves such that the piston is disengaged from the electronically controlled converter clutch;

wherein the transfer of hydraulic fluid from the first cavity to the second cavity in the opposite direction is only through the one or more orifices such that the piston engages the electronically controlled converter clutch.

2. The torque converter of claim 1, further comprising an isolator operatively connected to the electronically controlled converter clutch, the isolator being configured to at least partially absorb engine torque spikes and thereby provide smoother operation.

3. The torque converter of claim 2, further comprising a torque converter pump attached to the torque converter housing, the torque converter pump being operatively connected to a pump hub; a turbine disposed within the torque converter housing, the turbine being operatively connected to a turbine shaft; and a stator disposed between the torque converter pump and the turbine, the stator being operatively connected to a stator shaft.

4. The torque converter of claim 3, wherein the release passage is defined between the pump hub and the stator shaft.

5. The torque converter of claim 4, wherein the apply passage is defined between the stator shaft and the turbine shaft.

6. The torque converter of claim 5, wherein the isolator is disposed downstream from the turbine such that any turbine inertia spikes are at least partially absorbed thereby providing smoother operation.

7. The torque converter of claim 5, wherein the electronically controlled converter clutch includes a first and second plurality of clutch plates.

8. The torque converter of claim 7, wherein the piston is selectively configured to bring the first and second plurality of clutch plates into engagement and thereby engage the electronically controlled converter clutch.

9. A torque converter for an automatic transmission comprising:

a torque converter housing;

a torque converter pump mounted to the torque converter housing, the torque converter pump being operatively connected to a pump hub;

a turbine disposed within the torque converter housing, the turbine being operatively connected to a turbine shaft;

a stator disposed between the torque converter pump and the turbine, the stator being operatively connected to a stator shaft;

an electronically controlled converter clutch disposed within the torque converter housing;

wherein the electronically controlled converter clutch includes a first and second plurality of clutch plates;

an isolator operatively connected to the electronically controlled converter clutch, the isolator being configured to at least partially absorb engine torque spikes and thereby provide smoother operation;

wherein the isolator is disposed downstream from the turbine such that any turbine inertia spikes are at least partially absorbed thereby providing smoother operation;

a release passage defined between the pump hub and the stator shaft, the release passage in fluid communication with the electronically controlled converter clutch, the release passage being configured to transfer hydraulic fluid to release the electronically controlled converter clutch; and an apply passage defined between the stator shaft and the turbine shaft, the apply passage in fluid communication with the electronically controlled converter clutch, the apply passage configured to transfer hydraulic fluid to engage the electronically controlled converter clutch;

a piston defining a first cavity and a second cavity and configured to selectively engage the electronically controlled converter clutch;

wherein the first cavity is in fluid communication with the apply passage such that hydraulic fluid is applied from the apply passage to the piston to engage the electronically controlled converter clutch;

wherein the second cavity is in fluid communication with the release passage such that hydraulic fluid is applied from the release passage to the piston to release the electronically controlled converter clutch;

wherein the electronically controlled converter clutch is actuatable by transferring hydraulic fluid through the apply passage without providing a dedicated hydraulic line to control the piston;

wherein the piston includes one or more orifices configured to permit the transfer of a predetermined amount of hydraulic fluid through the piston in order to facilitate the circulation of hydraulic fluid and thereby cool the torque converter;

wherein the piston includes one or more one-way valves configured to permit the transfer of hydraulic fluid in a first direction from the second cavity to the first cavity through the piston, and to restrict the transfer of hydraulic fluid in an opposite direction from the first cavity to the second cavity through the piston;

wherein the transfer of hydraulic fluid from the second cavity to the first cavity in the first direction is only through the one or more orifices and the one or more one-way valves such that the piston is disengaged from the electronically controlled converter clutch;

wherein the transfer of hydraulic fluid from the first cavity to the second cavity in the opposite direction is only through the one or more orifice such that the piston engages the electronically controlled converter clutch.

10. The torque converter of claim 9, wherein the piston is selectively configured to bring the first and second plurality of clutch plates into engagement and thereby engage the electronically controlled converter clutch.

11. A method for controlling an electronically controlled converter clutch for a torque converter comprising:

providing an electronically controlled converter clutch disposed within a torque converter housing;

providing a release passage defined between standard functional torque converter components and in fluid communication with the electronically controlled converter clutch;

providing an apply passage defined between standard functional torque converter components and in fluid communication with the electronically controlled converter clutch;

providing a piston defining a first cavity in fluid communication with the apply passage and a second cavity in fluid communication with the release passage and configured to selectively engage the electronically controlled converter clutch;

transferring hydraulic fluid into one of said apply passage and the release passage; and transferring hydraulic fluid from one of the apply passage and the release passage to a corresponding one of the first cavity and the second cavity in order to control the engagement of the torque converter such that the electronically controlled converter clutch is selectively actuatable without providing an additional dedicated hydraulic line;

selectively transferring hydraulic fluid through one or more one-way valves and one or more orifices defined in the piston to permit the transfer of hydraulic fluid in a first direction from second cavity to the first cavity to only flow through the one or more one-way valves and the one or more orifices such that the piston is disengaged from the electronically controlled converter clutch, and to restrict the transfer of hydraulic fluid in an opposite direction from the first cavity to the second cavity to only flow through the one or more orifices such that the piston engages the electronically controlled converter clutch.

12. The method of claim 11, wherein said providing an electronically controlled converter clutch includes providing an electronically controlled converter clutch having a first plurality of clutch plates; a second plurality of clutch plates; and a piston configured to selectively engage said first and second plurality of clutch plates and thereby engage the electronically controlled converter clutch.

* * * * *